(12) United States Patent
Kuroda

(10) Patent No.: US 7,787,195 B2
(45) Date of Patent: Aug. 31, 2010

(54) ILLUMINATION LENS AND ENDOSCOPE ILLUMINATING OPTICAL SYSTEM

(75) Inventor: Osamu Kuroda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/458,202

(22) Filed: Jul. 2, 2009

(65) Prior Publication Data

US 2010/0060997 A1 Mar. 11, 2010

(30) Foreign Application Priority Data

Sep. 11, 2008 (JP) ............................. 2008-233652

(51) Int. Cl.
*G02B 13/18* (2006.01)
(52) U.S. Cl. ..................................... 359/718
(58) Field of Classification Search .............. 359/708, 359/718, 719
See application file for complete search history.

(56) References Cited

U.S. PATENT DOCUMENTS 4,952,040 A * 8/1990 Igarashi ................. 359/708

FOREIGN PATENT DOCUMENTS

JP 3020074 1/2000
JP 2002-244050 8/2002

* cited by examiner

*Primary Examiner*—Scott J Sugarman
(74) *Attorney, Agent, or Firm*—McGinn IP Law Group, PLLC

(57) ABSTRACT

An endoscope illuminating optical system includes an illumination lens having a positive power. Illumination light rays parallel to each other emitted from an optical fiber bundle enter an incident surface of the illumination lens. The incident surface of the illumination lens is aspherical, and has a reference position vertical to the optical axis. The reference position is the most projecting portion on the incident surface. A shape of the incident surface is expressed by an equation of D=F(H). "H" is a height from the optical axis (0≦H≦Hmax), and "D" is a depth from a reference plane. The reference plane is vertical to the optical axis. The reference position is on the reference plane. A first-order differential value of the function F(H) is more than 0, and a second-order differential value of the function F(H) is 0 at a particular height Hi (0<Hi<Hmax).

10 Claims, 8 Drawing Sheets

FIG.4

| EXAMPLE | | | |
|---|---|---|---|
| H(mm) | D(mm) | DC1 | DC2 |
| 0.000 | 0.000000 | – | – |
| 0.0025 | 0.000000 | 0.000000 | – |
| 0.0050 | 0.000000 | 0.000000 | 0.000000 |
| 0.0075 | 0.000000 | 0.000000 | 0.000000 |
| 0.0100 | 0.000873 | 0.349208 | 139.683078 |
| 0.0125 | 0.002621 | 0.699268 | 140.024170 |
| 0.0150 | 0.005771 | 1.259882 | 224.245383 |
| 0.0175 | 0.010543 | 1.908854 | 259.589085 |
| 0.0200 | 0.016998 | 2.581989 | 269.253843 |
| 0.0225 | 0.025222 | 3.289758 | 283.107831 |
| 0.0250 | 0.035335 | 4.045199 | 320.176280 |
| 0.0275 | 0.047475 | 4.855739 | 324.215972 |
| 0.0300 | 0.064980 | 6.602075 | 698.534511 |
| 0.0325 | 0.083319 | 7.735541 | 453.386048 |
| 0.0350 | 0.104063 | 8.297840 | 224.919932 |
| 0.0375 | 0.125796 | 8.692867 | 158.010818 |
| 0.0400 | 0.149108 | 9.325151 | 252.913393 |
| 0.0425 | 0.173251 | 9.656888 | 132.694755 |
| 0.0450 | 0.198251 | 10.000000 | 137.244901 |
| 0.0475 | 0.224139 | 10.355303 | 142.121255 |
| 0.0500 | 0.250027 | 10.355303 | 0.000000 |
| 0.0525 | 0.275027 | 10.000000 | -142.121255 |
| 0.0550 | 0.299169 | 9.65888 | -137.244901 |
| 0.0575 | 0.322482 | 9.325151 | -132.694755 |
| 0.0600 | 0.344992 | 9.004040 | -128.444167 |
| 0.0625 | 0.366725 | 8.692867 | -124.469226 |
| 0.0650 | 0.387702 | 8.390996 | -120.748427 |
| 0.0675 | 0.407947 | 8.097840 | -117.262392 |
| 0.0700 | 0.426785 | 7.535541 | -224.919932 |
| 0.0725 | 0.444291 | 7.002075 | -213.386048 |
| 0.0750 | 0.460526 | 6.494076 | -203.199780 |
| 0.0775 | 0.474384 | 5.543091 | -380.394167 |
| 0.0800 | 0.486577 | 4.877326 | -266.305852 |
| 0.0825 | 0.497189 | 4.244748 | -253.031089 |
| 0.0850 | 0.506785 | 3.838640 | -162.443125 |

ILLUMINATION LENS AND ENDOSCOPE ILLUMINATING OPTICAL SYSTEM

FIELD OF THE INVENTION

The present invention relates to an illumination lens and an endoscope illuminating optical system using the same.

BACKGROUND OF THE INVENTION

An endoscope is widely used in an industrial field, a medical field, and the like. The endoscope consists of an operation section and an insertion section. The insertion section is flexible and inserted into an object. The insertion section contains an optical fiber bundle (light guide) for guiding illumination light rays from a light source device. A distal end surface of the insertion section has an illumination window, an observation window, and the like. An illuminating optical system is disposed between the illumination window and the optical fiber. An imaging optical system is disposed behind the observation window. In a case of a fiber scope, an image formed by the imaging optical system is taken out by the optical fiber bundle (image guide). In a case of an electronic endoscope, an image sensor is disposed behind the imaging optical system.

Depending on the intended use, the endoscope is used to observe objects having various kinds of shapes. The objects to be observed by the endoscope may be planar, spherical, or tubular. For example, objects to be observed by a medical endoscope have an approximately spherical shape such as an interior of stomach, and an approximately tubular shape such as an interior of esophagus or bronchi.

In recent years, a wide angle lens has been adopted for the imaging optical system of the endoscope. In accordance with this, it has been demanded that the illuminating optical system also has a wider angle. Namely, it has been demanded that the illuminating optical system increases its illumination area. Additionally, the illuminating optical system has been required to illuminate an object to be observed with uniform illuminance distribution.

In response to the demand described above, an illuminating optical system having at least one positive lens is disclosed in Japanese Patent No. 3020074. The illuminating optical system almost satisfies a condition expressed by $H=F\cdot\theta$, in which a focal length is denoted by F, a height of light ray incident on the optical system in parallel with an optical axis (hereinafter referred to as incident light ray height) is denoted by H, and an angle at which the light ray having the incident ray height H exits from the optical system is denoted by $\theta$. Illumination light rays emitted from the optical fiber bundle are converged once, and then diverged inside the positive lens, and therefore it is possible to illuminate a wide area. Further, when a spherical body is illuminated, the illuminance on the spherical subject is increased from the center toward the marginal portion of the spherical body. Additionally, the light rays which are to travel toward the marginal portion of the spherical body through the lens are irregularly reflected and disappear or totally reflected by the inside of an outer circumferential surface of the lens. Accordingly, it is possible to illuminate the spherical body with approximately uniform illuminance distribution, and further illuminate the planar body and the tubular body with favorable illuminance distribution.

Additionally, an illuminating optical system disclosed in Japanese Patent Laid-Open Publication No. 2002-244050 is provided with at least one light distribution lens. One surface of the light distribution lens is partitioned into plural concentric ring zones. A convex surface and a concave surface are continuous at a boundary of these ring zones. One of the convex surface and the concave surface has a shape obtained by shifting part of a reference curved surface in the optical axis direction. The other of them has a shape symmetrical to the reference curved surface with respect to a surface vertical to the optical axis. The light distribution lens has a shape similar to that of a Fresnel lens, and therefore it is possible to decrease the thickness of the lens.

However, in the illumination optical system disclosed in Japanese Patent No. 3020074, a tilt angle of an incident surface in a marginal portion of the lens is made to be wide, such that all light rays incident on the lens pass through the lens and then are focused on the optical axis. The lens is produced by molding. The molding is performed by pressing a spherical preform made of glass. In the molding, since the tilt angle in the marginal portion of the lens is wide, it is difficult to keep precision, and further the molding takes much time.

In the illumination optical system disclosed in Japanese Patent Laid-Open Publication No. 2002-244050, the lens has a complicated shape having an acute concentric part. Accordingly, it is difficult to keep precision in the molding, and the molding takes much time.

Additionally, in both illumination optical systems disclosed in the above patent documents, the light rays which pass through the illumination optical system are once converged and then diverged, and therefore a converging point at which light energy is high is formed. Since the converging point is outside the illumination optical system, if the illumination window approaches an interior of stomach or the like, the interior of stomach or the like may be damaged in some cases. Further, unless the illumination window is away from the object to be observed to some extent, it is impossible to illuminate the object with a wide light distribution angle.

SUMMARY OF THE INVENTION

In view of the above, a primary object of the present invention is to provide an illumination lens and an endoscope illuminating optical system capable of preventing light energy from concentrating at one point.

Another object of the present invention is to provide an illumination lens and an endoscope illuminating optical system suitable for molding.

In order to achieve the above and other objects, an illumination lens of the present invention includes an aspherical incident surface. A reference position intersecting an optical axis is the most projecting portion of the incident surface. A shape of the incident surface is expressed by an equation of $D=F(H)$. D is a depth from a reference plane. The reference plane is vertical to the optical axis, and the reference position is located on the reference plane. F(H) is a function where H is a variable. H is a height from the optical axis, and falls in a range of $0 \leq h \leq Hmax$. A first-order differential value of the function F(H) is 0 or more, and a second-order differential value of the function F(H) is 0, when the H is a particular height Hi in a range of $0<Hi<Hmax$.

Some illumination light rays entering the incident surface are converged once and then diverged inside the lens, and the others are diverged without being converged. A first-order differential value of the function F(H) is preferably 0, when the H is a height Hj in a range of $0<Hj \leq Hmax \times 0.1$ in the illumination lens. The illumination lens preferably has a flat exit surface. The illumination lens is preferably a molded product obtained by pressing a preform.

An endoscope illuminating optical system of the present invention includes at least one illumination lens for spreading parallel illumination light rays from a fiber bundle. The illumination lens includes an aspherical incident surface facing the fiber bundle. The incident surface has a reference position intersecting the optical axis. The reference position is the most projecting portion of the incident surface. A shape of the incident surface is expressed by an equation of D=F(H). D is a depth from a reference plane. The reference plane is vertical to the optical axis, and the reference position is located on the reference plane. F(H) is a function where H is a variable. H is a height from the optical axis, and falls in a range of $0 \leq h \leq Hmax$. When the H is a particular height Hi in a range of $0 < Hi < Hmax$, a first-order differential value of the function F(H) is 0 or more, and a second-order differential value of the function F(H) is 0.

According to the present invention, since light energy is not concentrated at one point, an object proximate to a distal end of the endoscope is not thermally influenced. Further, while some incident light rays are converged inside the lens, the others are diverged without being converged. Thereby, even if the object is proximate to the distal end of the endoscope, it is possible to illuminate the object with wide light distribution angle.

Further, according to the present invention, the shape of the incident surface is not complicated, and a tilt angle of the incident surface in the edge of the lens is not wide. Therefore, it is possible to mold the illumination lens with facility and high precision.

DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 4 is a table showing an exemplary data of the illumination lens shown in FIG. 3;

DESCRIPTION OF THE PREFERRED EMBODIMENTS

Hereinafter, preferred embodiments of the present invention are described in detail. However, the present invention is not limited thereto.

Figure 1:
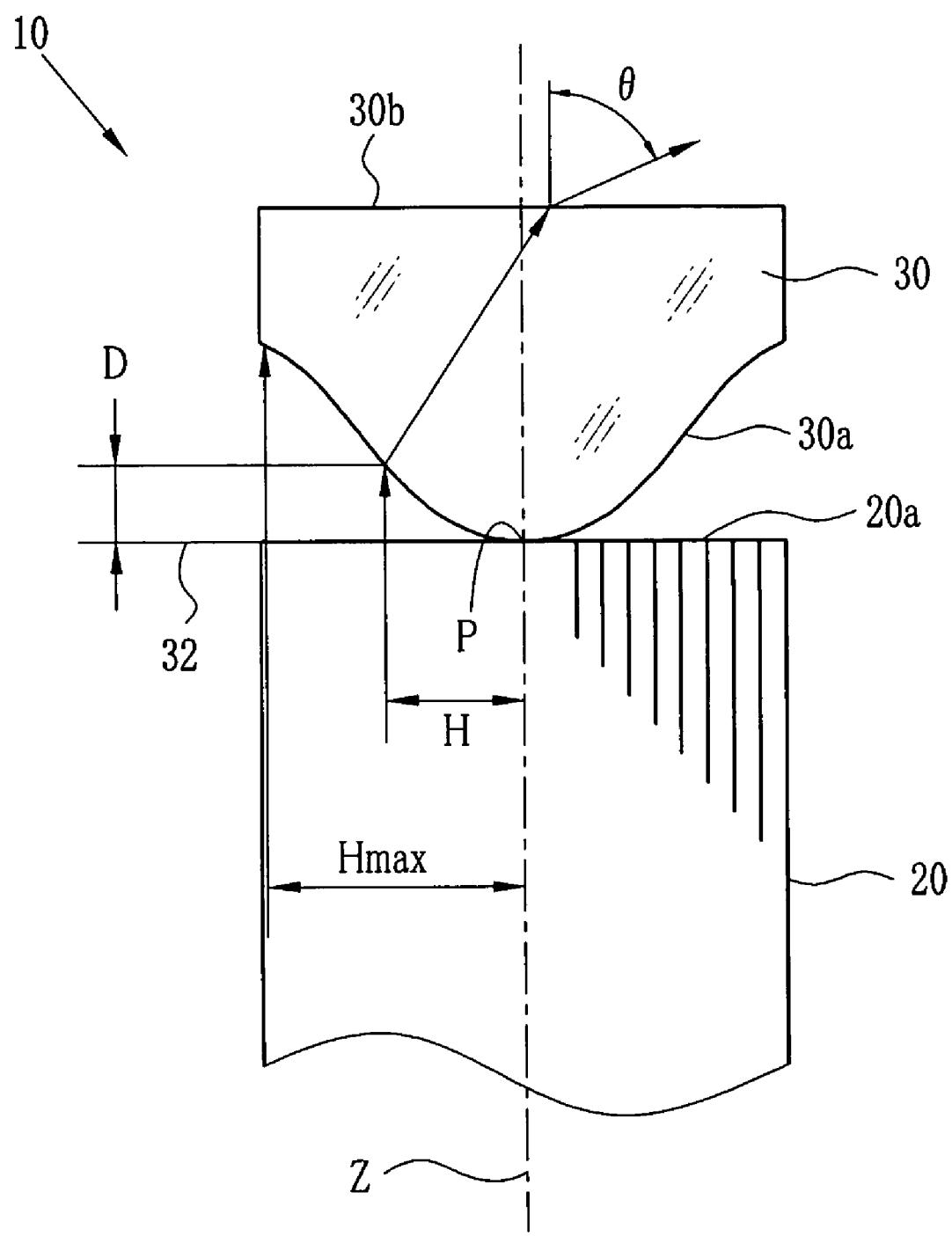
FIG. 1 is an explanatory view illustrating an endoscope illuminating optical system according to an embodiment of the present invention.

As well known in the art, an endoscope (not shown) includes an optical fiber bundle (light guide) 20 as shown in FIG. 1. An illumination window (not shown) is formed on a distal end surface of the endoscope. Between the optical fiber bundle 20 and the illumination window, there is provided an endoscope illuminating optical system (hereinafter referred to as illuminating optical system) 10. The illuminating optical system 10 includes one illumination lens (hereinafter referred to as lens) 30 in this embodiment.

The optical fiber bundle 20 guides illumination light rays emitted from a light source device (not shown). The illumination light rays parallel to each other exiting from an exit end 20a enter an incident surface 30a of the lens 30. Some illumination light rays entering the incident surface 30a are converged inside the lens 30 once, and then pass through the lens 30 while being diverged. Other illumination light rays pass through the lens 30 while being diverged without being converged. The illumination light rays diverged by the lens 30 pass through the illumination window, and illuminate an object. Accordingly, illumination light spreads from the illumination window at a wide angle, and even if the object to be illuminated is proximate to the illumination window, it is possible to illuminate the object with uniform illuminance toward a wide range.

The lens 30 is obtained by molding a preform made of glass. The incident surface 30a of the lens 30 projects convexly toward the optical fiber bundle 20. The incident surface 30a projects most at a reference position P intersecting the optical axis Z. An exit surface 30b of the lens 30 is flat. The lens 30 as a whole has a positive power. The reference position P is a vertex of the incident surface 30a in this embodiment.

The shape of the incident surface 30a is expressed by an equation of D=F(H). "D" is a depth from a reference plane 32. The reference plane 32 is vertical to the optical axis Z. The reference position P is on the reference plane 32. On the reference plane 32, the value of D is zero. F(H) is a function in which "H" is a variable. "H" is a height from the optical axis Z, and falls in a range between 0 or more and Hmax or less ($0 \leq H \leq Hmax$). The exit end 20a of the optical fiber bundle 20 is positioned on the reference surface 32 in this embodiment.

Further, when "H" is a particular height "Hi", a first-order differential value of the function F(H) is 0 or more, and a second-order differential value of the function F(H) is 0. The particular height "Hi" is located between a position on the optical axis Z (H=0) and a position at a maximum height (H=Hmax). Namely, the particular height "Hi" satisfies a condition expressed by 0<Hi<Hmax.

Figure 2:
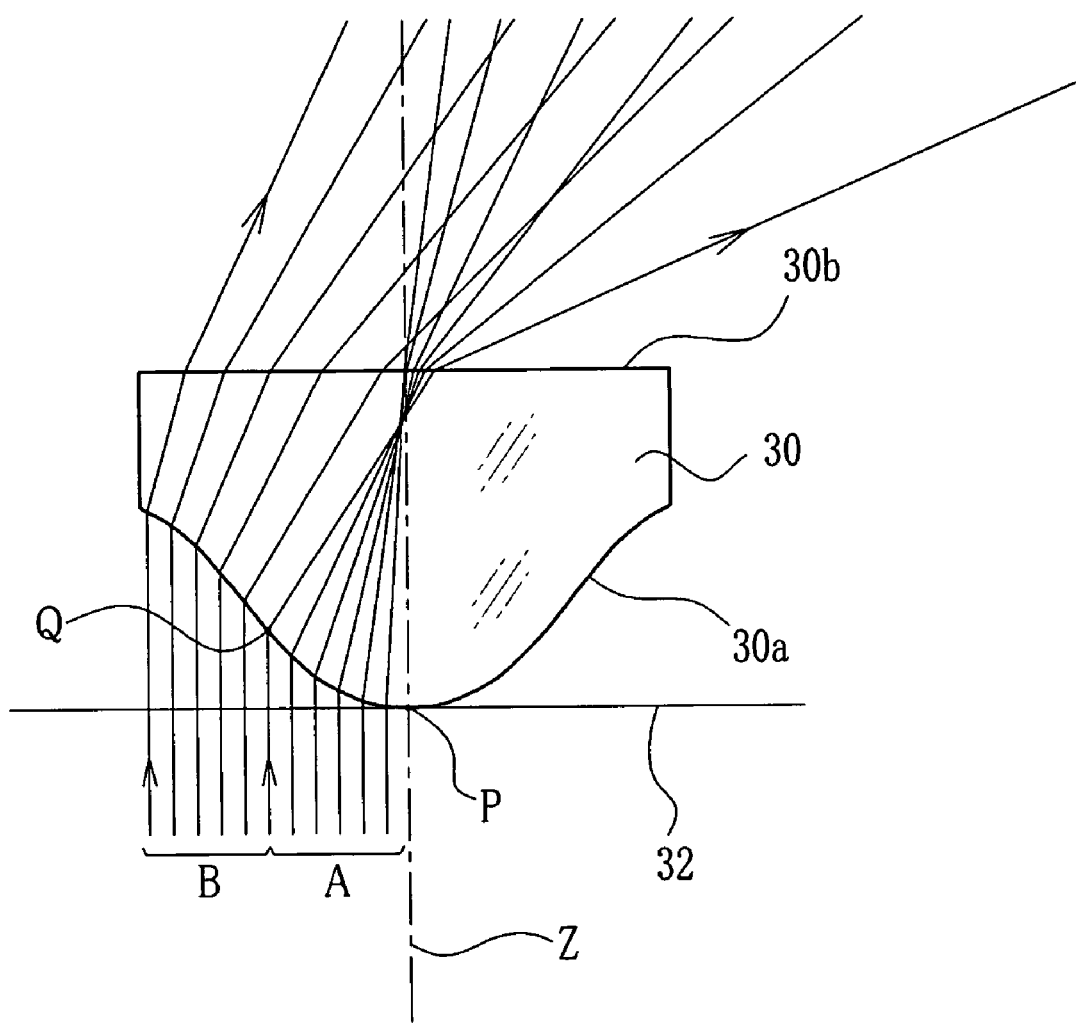
FIG. 2 is a view illustrating an optical path of an illumination lens.

As shown in FIG. 2, the incident surface 30a of the lens 30 has an inflection point Q. On the inflection point Q, the particular height "Hi" corresponds to the height "H" (H=Hi). In the range from the optical axis Z to the inflection point Q (a range shown by "A" in the drawing), the light rays incident on the incident surface 30a are approximately converged once, and then diverged inside the lens 30. The diverged light rays are further diverged by the exit surface 30b of the lens 30 to constitute a first light ray group having wide-angle luminous intensity distribution. Furthermore, in the range from the inflection point Q to an edge of the lens 30 (a range shown by "B" in the drawing), the light rays incident on the incident surface 30a are diverged without being converged inside the lens 30. These light rays are further diverged by the exit surface 30b of the lens 30 to constitute a second light ray group having wide-angle luminous intensity distribution.

The first and second light ray groups each having wide-angle luminous intensity distribution exit from the exit surface 30b of the lens 30. The first light ray group, consisting of the incident light rays once converged and then diverged inside the lens 30, illuminates a wide-angle range (for example, total angle of 120°). The second light ray group, consisting of the incident light rays diverged without being converged, illuminates a range defined by a distance from the exit surface 30b. Accordingly, it is possible to illuminate the spherical body and the tubular body with an approximately uniform illuminance distribution by the illumination light rays through the lens 30. In addition to this, the illumination light rays are not converged outside the lens 30.

Figure 3:
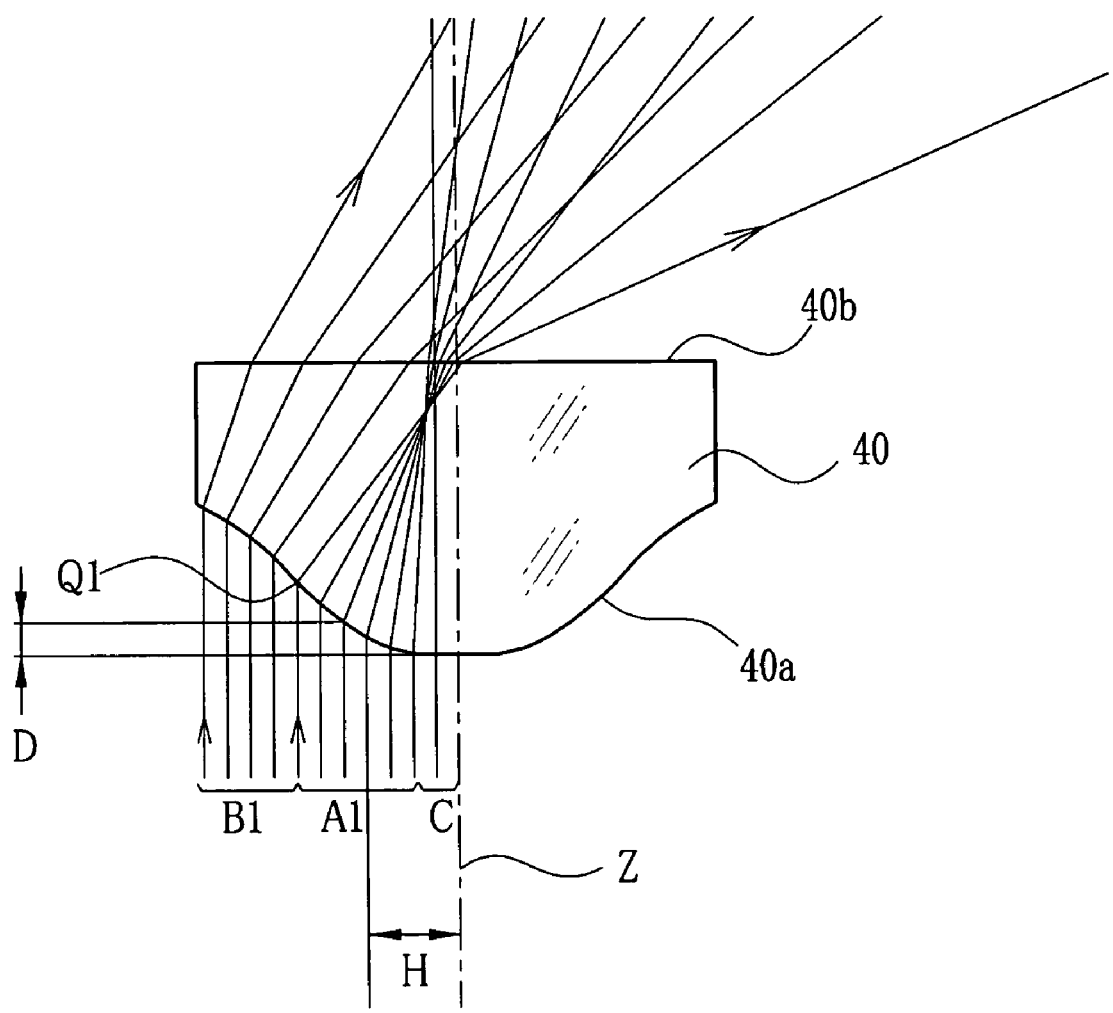
FIG. 3 is a view illustrating an optical path of an illumination lens whose top portion is flat according to another embodiment of the present invention.

FIG. 3 shows a lens according to another embodiment. In a lens 40, when "H" is a particular height "Hj", a first-order differential value of F(H) is 0. The particular height "Hj" falls in a range between more than 0 and Hmax×0.1 or less (0<Hj≦Hmax×0.1). An incident surface 40a defined by the above condition has a flat portion perpendicular to the optical axis Z within a range expressed by Hmax×0.1 around the optical axis Z. The light rays entering the flat portion of the incident surface 40a shown by "C" in the drawing pass through the lens 40 in parallel with the optical axis Z. As in the case of the lens 30 shown in FIG. 2, the incident surface 40a of the lens 40 has an inflection point Q1 outside the flat portion. In the range from the inflection point Q1 to the flat portion (a range shown by "A1" in the drawing), the light rays entering the incident surface 40a are approximately converged once, and then diverged inside the lens 40. Further, in the range from the inflection point Q1 to an edge of the lens 40 (a range shown by "B1" in the drawing), the light rays entering the incident surface 40a are diverged without being converged inside the lens 40. In the lens 40, the incident light rays around the optical axis Z are not refracted, and therefore it is possible to prevent decrease in the luminance around the optical axis Z. The reference numeral 40b denotes an exit surface of the lens 40.

FIG. 4 is a table showing an exemplary data of the lens 40. In the table, the symbol DC1 denotes a first-order differential value, and the symbol DC2 denotes a second-order differential value. When the points represented by the depth "D" in the table are connected by a spline, a curved line 42 shown in FIG. 5 appears. The curved line 42 represents a cross sectional shape of the incident surface 40a. Therefore, a shape of the incident surface 40a is obtained by rotating the curved line 42 around the optical axis Z. Note that, for comparison, a shape of the conventional lens described in Japanese Patent No. 3020074 is shown by a curved line 43 in FIG. 5.

Figure 6:
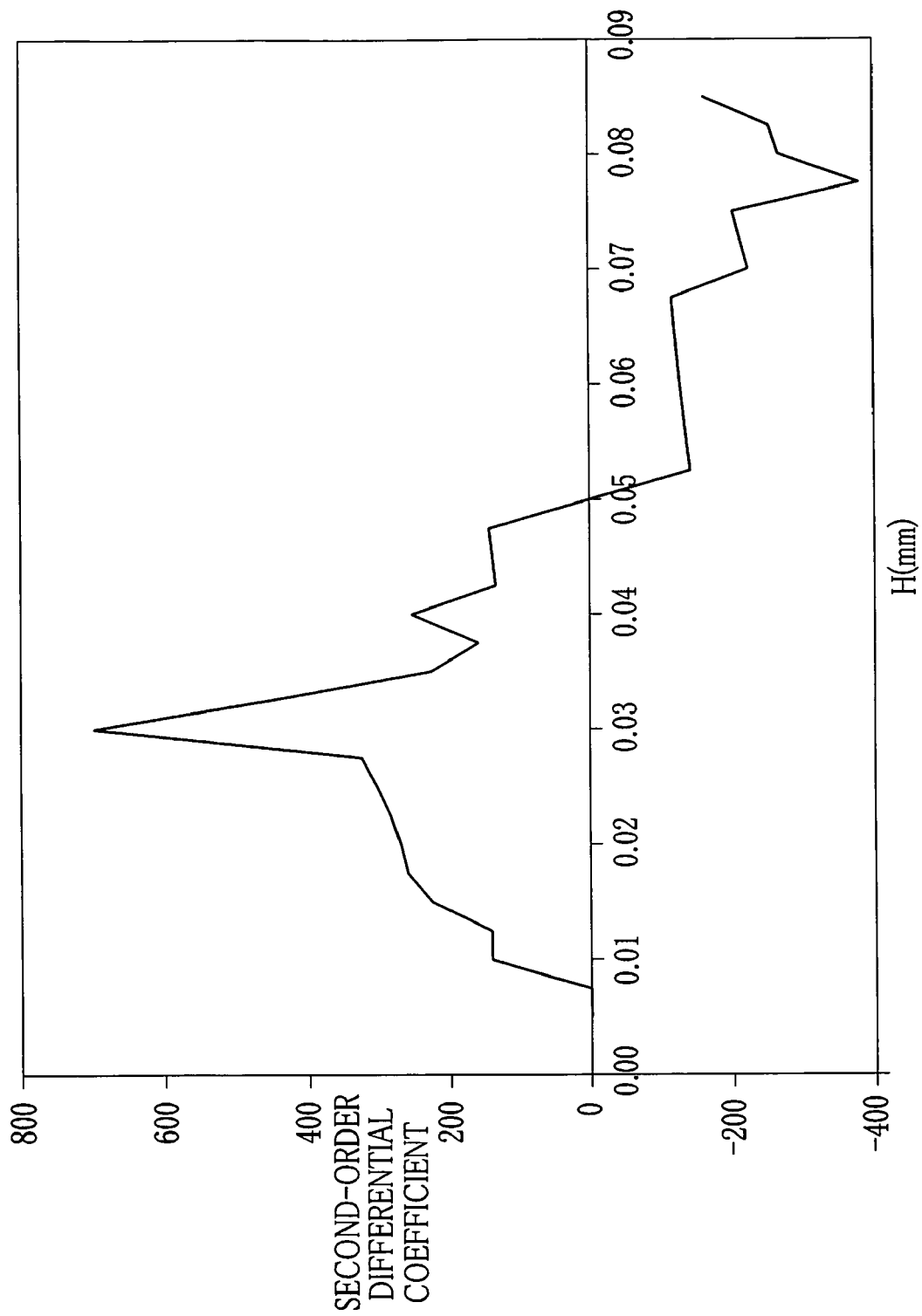
FIG. 6 is a graph showing second-order differential values.

A graph shown in FIG. 6 plots the second-order differential values shown in the table of FIG. 4. The inflection point Q1 is positioned at a point where the height "Hi" is 0.05. Inside the inflection point Q1, the incident surface 40a is convex. In contrast, outside the inflection point Q1, the incident surface 40a is concave.

Figure 5:
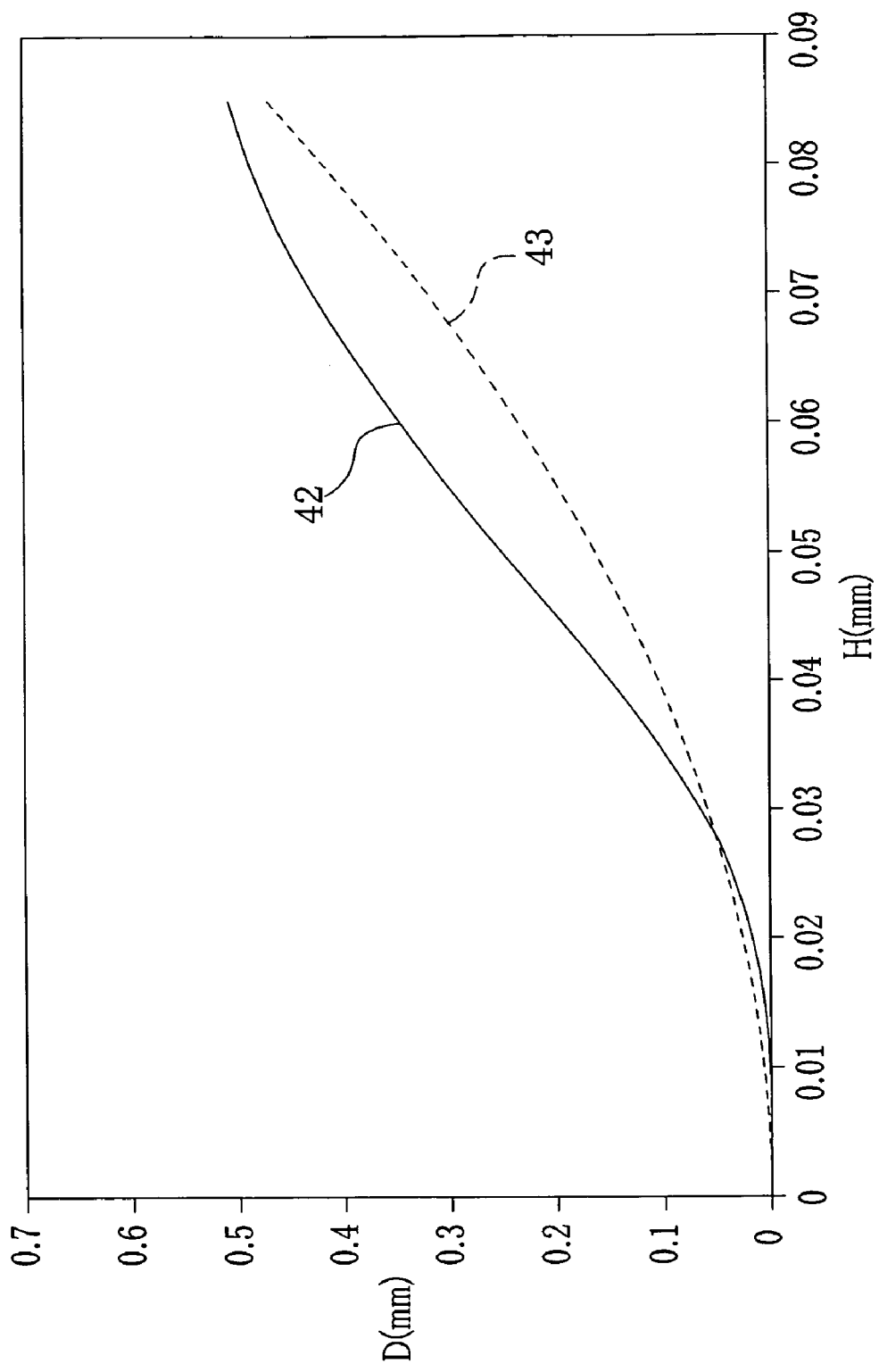
FIG. 5 is a graph showing a shape of an incident surface.
Figure 7:
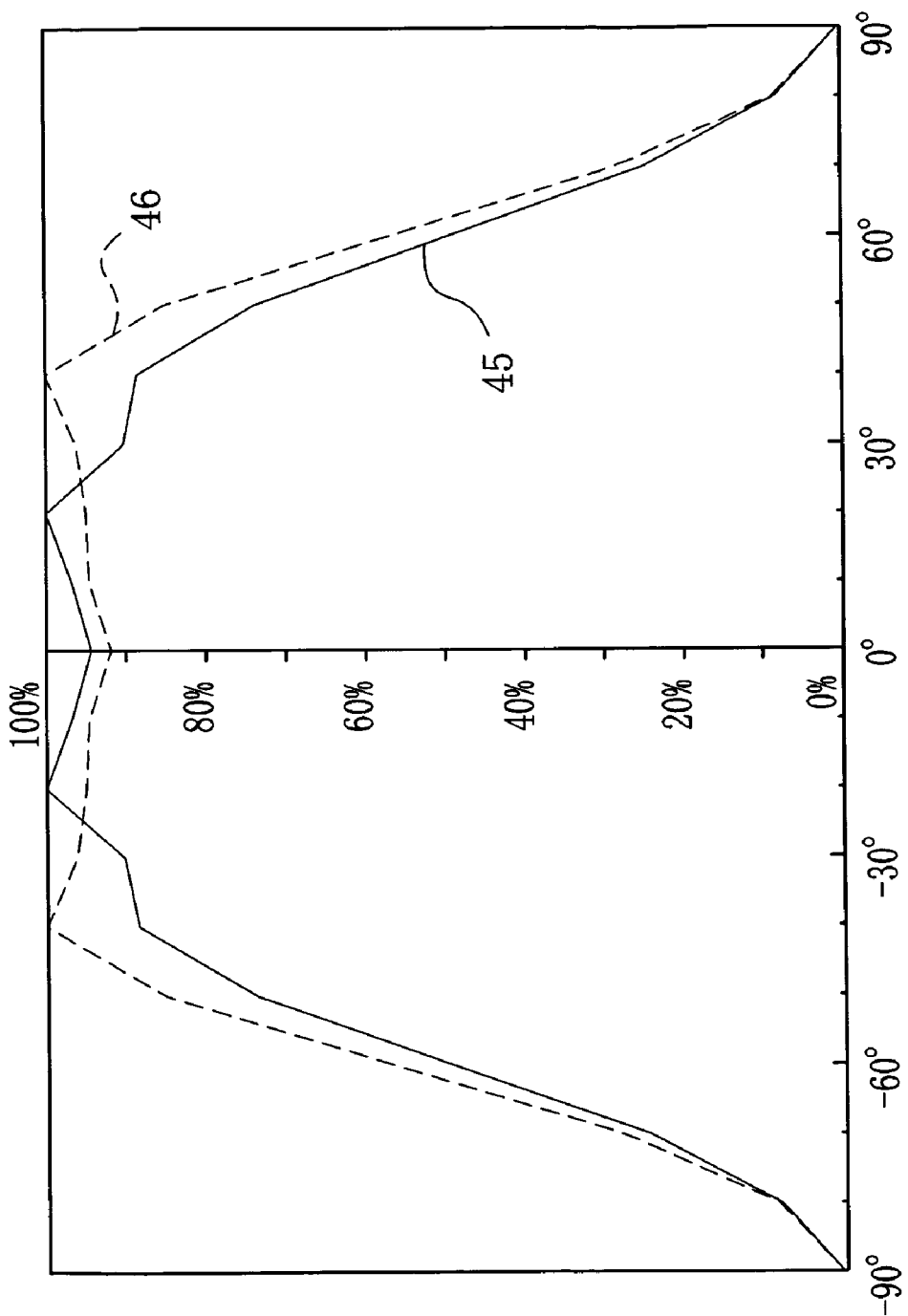
FIG. 7 is a graph showing a luminous intensity distribution.

As shown in FIG. 5, in the edge of the lens 40 of the present invention, the angle between the incident surface 40a of the lens 40 obtained by rotating the curved line 42 around the optical axis Z and a surface perpendicular to the optical axis Z is smaller in comparison with the incident surface of the conventional lens described in Japanese Patent No. 3020074 obtained by rotating the curved line 43. Thus, the shape of the lens 40 is easier to form. Furthermore, as shown in FIG. 7, a luminous intensity distribution 45 of the lens 40 is approximately equivalent to a luminous intensity distribution 46 of the conventional lens described in Japanese Patent No. 3020074.

When the exit surface of each of the lenses 30 and 40 is coated with Magnesium Fluoride ($MgF_2$), it is possible to decrease Fresnel reflection of the light rays exiting from the exit surface and to increase amount of light rays exiting from the exit surface. Additionally, since the coating has a water-repellent property, water droplets, which lead to degradation of illuminance distribution, hardly adhere to the lenses 30 and 40.

Figure 8:
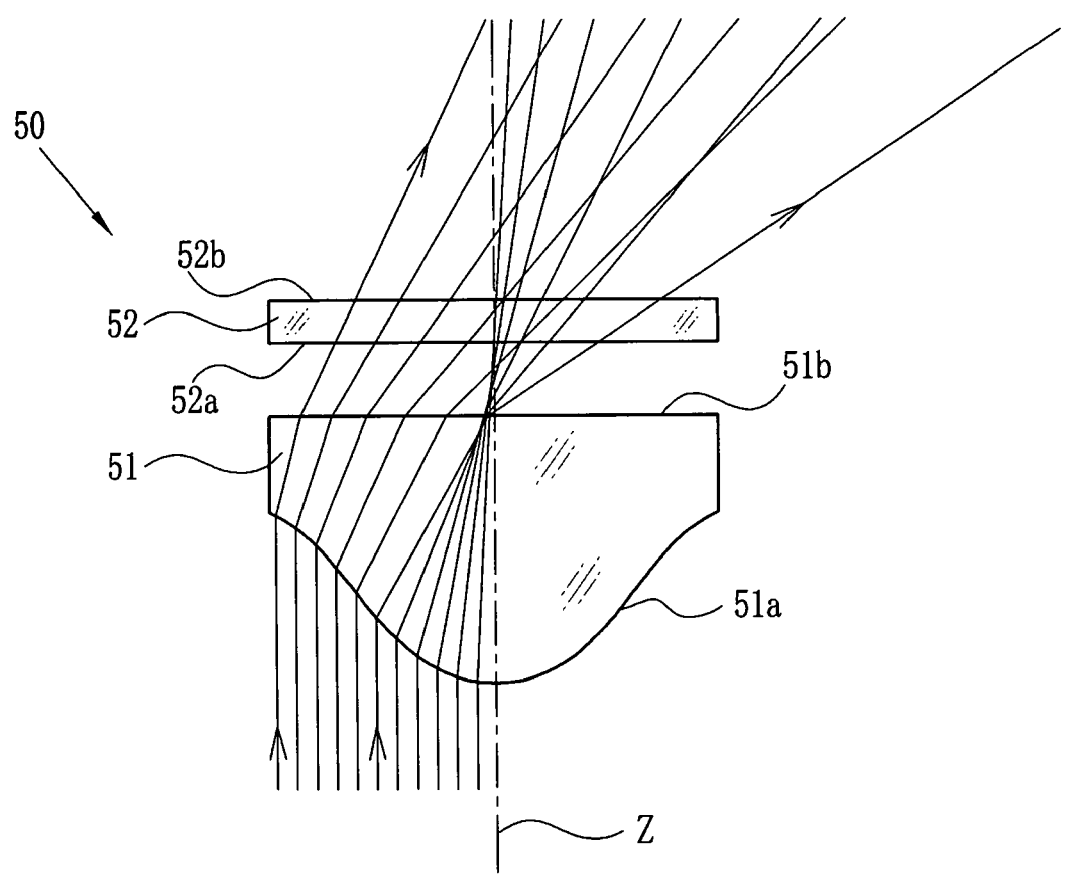
FIG. 8 is a view illustrating an optical path of an endoscope illuminating optical system according to another embodiment of the present invention.

An endoscope illuminating optical system 50 shown in FIG. 8 consists of a lens 51 and a protective glass 52 disposed behind the lens 51. Even if some illumination light rays entering an incident surface 51a of the lens 51 are converged outside an exit surface 51b of the lens 51, as far as the point at which the illumination light rays are converged is inside an exit surface 52b of the protective glass 52, the illumination light rays are considered to be converged inside the endoscope illuminating optical system 50. Therefore, it is possible to prevent the object from being damaged by high energy. Note that the reference numeral 52a denotes an incident surface of the protective glass 52.

Although the illuminating system 10 includes one lens in the above embodiments, the present invention is not limited thereto. The illuminating system of the present invention may include plural lenses. Further, although the lens is a molded glass in the above embodiments, the lens may be a molded plastic.

Various changes and modifications are possible in the present invention and may be understood to be within the present invention.

What is claimed is:

1. An illumination lens comprising:
   an aspherical incident surface having a reference position intersecting an optical axis, said reference position being the most projecting portion of said incident surface, wherein
   a shape of said incident surface is expressed by an equation of D=F(H), where H is a height from said optical axis and falls in a range of 0≦H≦Hmax, and D is a depth from a reference plane which is vertical to said optical axis and on which said reference position is located, and
   a first-order differential value of the function F(H) is 0 or more, and a second-order differential value of the function F(H) is 0, when said H is a particular height Hi in a range of 0<Hi<Hmax.

2. An illumination lens as defined in claim 1, wherein a first-order differential value of the function F(H) is 0, when said H is a height Hj in a range of 0<Hj≦Hmax×0.1.

3. An illumination lens as defined in claim 1, wherein some illumination light rays entering said incident surface are converged and then diverged inside said lens, and the others are diverged without being converged.

4. An illumination lens as defined in claim 1, further comprising a flat exit surface.

5. An illumination lens as defined in claim 1, wherein said illumination lens is a molded product obtained by pressing a preform.

6. An endoscope illuminating optical system for illuminating an object by spreading parallel illumination light rays from a fiber bundle, said endoscope illuminating optical system comprising:
   at least one illumination lens having an aspherical incident surface, said incident surface facing said fiber bundle, wherein
   said incident surface having a reference position intersecting an optical axis, said reference position being the most projecting portion of said incident surface,
   a shape of said incident surface is expressed by an equation of D=F(H), where H is a height from said optical axis and falls in a range of 0≦H≦Hmax, and D is a depth from a reference plane which is vertical to said optical axis and on which said reference position is located, and
   a first-order differential value of the function F(H) is 0 or more, and a second-order differential value of the function F(H) is 0, when said H is a particular height Hi in a range of 0<Hi<Hmax.

7. An illumination lens as defined in claim 6, wherein a first-order differential value of the function F(H) is 0, when said H is a height Hj in a range of $0 < Hj \leqq Hmax \times 0.1$.

8. An illumination lens as defined in claim 6, wherein some illumination light rays entering said incident surface are converged and then diverged inside said lens, and the others are diverged without being converged.

9. An illumination lens as defined in claim 6 further comprising a flat exit surface.

10. An illumination lens as defined in claim 6, wherein said illumination lens is a molded product obtained by pressing a preform.

* * * * *